United States Patent
Ladhak et al.

(10) Patent No.: US 10,210,862 B1
(45) Date of Patent: Feb. 19, 2019

(54) LATTICE DECODING AND RESULT CONFIRMATION USING RECURRENT NEURAL NETWORKS

(71) Applicant: Amazon Technologies, Inc., Seattle, WA (US)

(72) Inventors: Faisal Ladhak, Seattle, WA (US); Ankur Gandhe, Seattle, WA (US); Markus Dreyer, Seattle, WA (US); Ariya Rastrow, Seattle, WA (US); Björn Hoffmeister, Seattle, WA (US); Lambert Mathias, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 15/091,871

(22) Filed: Apr. 6, 2016

Related U.S. Application Data

(60) Provisional application No. 62/311,180, filed on Mar. 21, 2016.

(51) Int. Cl.

| | |
|---|---|
| *G06F 17/20* | (2006.01) |
| *G10L 15/00* | (2013.01) |
| *G10L 15/16* | (2006.01) |
| *G10L 19/038* | (2013.01) |
| *G06N 3/04* | (2006.01) |

(52) U.S. Cl.
CPC ............... *G10L 15/16* (2013.01); *G06N 3/04* (2013.01); *G10L 19/038* (2013.01)

(58) Field of Classification Search
CPC .......... G06F 17/30654; G06F 17/2765; G06F 17/30424; G06F 17/30477; G06F 17/30637; G06F 17/509; G10L 15/16; G10L 15/26; G10L 15/08; G10L 15/22; G10L 15/01; G10L 15/142; G10L 15/144; G10L 15/18
See application file for complete search history.

(56) References Cited

U.S. PATENT DOCUMENTS

| | | | |
|---|---|---|---|
| 9,600,231 B1 * | 3/2017 | Sun | .......................... G06F 3/167 |
| 9,691,384 B1 * | 6/2017 | Wang | ....................... G10L 15/22 |
| 9,805,371 B1 * | 10/2017 | Sapoznik | ............. G06Q 30/016 |

(Continued)

OTHER PUBLICATIONS

Graves, A., Mohamed, A.-R. & Hinton, G. Speech recognition with deep recurrent neural networks. In Proc. International Conference on Acoustics, Speech and Signal Processing 6645-6649 (2013).*

(Continued)

*Primary Examiner* — Michael Ortiz-Sanchez
(74) *Attorney, Agent, or Firm* — Pierce Atwood LLP

(57) ABSTRACT

Neural networks may be used in certain automatic speech recognition systems. To improve performance at these neural networks, the present system converts the lattice into a matrix form, thus maintaining certain information included in the lattice that might otherwise be lost while also placing the lattice in a form that may be manipulated by other components to perform operations such as checking ASR results. The matrix representation of the lattice may be transformed into a vector representation by calculations performed at a recurrent neural network (RNN). By representing the lattice as a vector representation the system may perform additional operations, such as ASR results confirmation.

20 Claims, 14 Drawing Sheets

(56) References Cited

U.S. PATENT DOCUMENTS

| | | | |
|---|---|---|---|
| 2004/0167778 A1* | 8/2004 | Valsan | G10L 15/16 704/231 |
| 2014/0278379 A1* | 9/2014 | Coccaro | G10L 15/1822 704/202 |
| 2015/0039299 A1* | 2/2015 | Weinstein | G10L 15/16 704/202 |
| 2016/0163310 A1* | 6/2016 | Lee | G10L 15/16 704/232 |
| 2016/0299685 A1* | 10/2016 | Zhai | G06F 3/0219 |
| 2017/0091169 A1* | 3/2017 | Bellegarda | G06F 17/276 |
| 2017/0103752 A1* | 4/2017 | Senior | G10L 15/16 |
| 2017/0221486 A1* | 8/2017 | Kurata | G10L 13/00 |
| 2017/0236512 A1* | 8/2017 | Williams | G10L 15/22 381/79 |

OTHER PUBLICATIONS

Graves, A., & Jaitly, N. (2014). Towards end-to-end speech recognition with recurrent neural networks. In Proc. 31st International conference on machine learning (pp. 1764-1772).*

* cited by examiner

FIG. 7
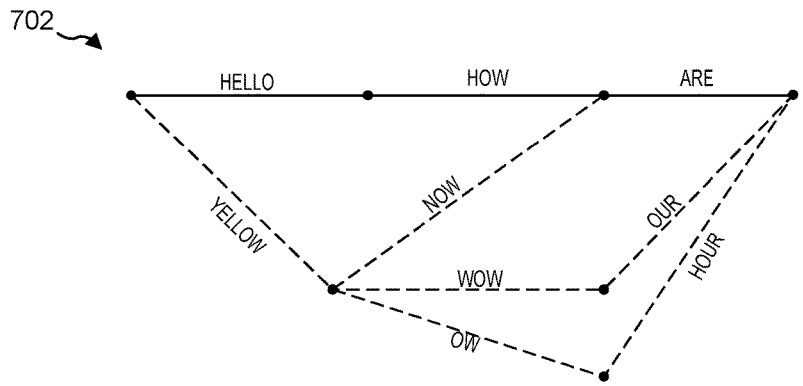
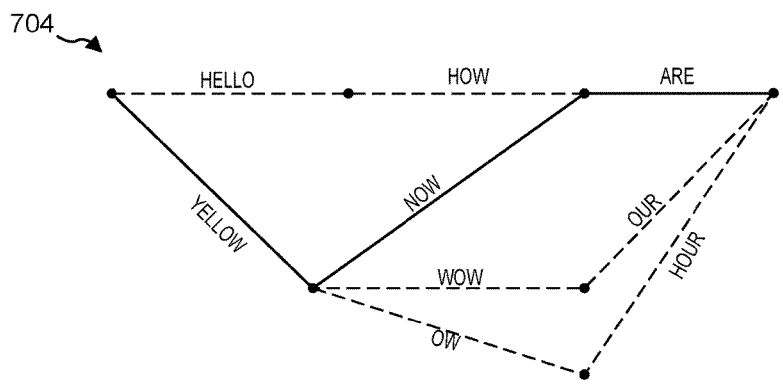
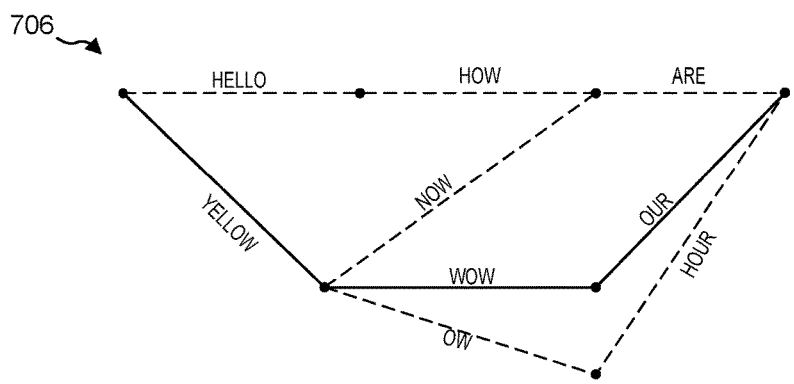

US 10,210,862 B1

LATTICE DECODING AND RESULT CONFIRMATION USING RECURRENT NEURAL NETWORKS

CROSS-REFERENCE TO RELATED APPLICATION DATA

This application claims priority to U.S. Provisional Patent Application Ser. No. 62/311,180, entitled "RECURRENT NEURAL NETWORK SPEECH RECOGNITION MODELS," filed on Mar. 21, 2016, in the names of Markus Dreyer et al. The above provisional application is herein incorporated by reference in its entirety.

BACKGROUND

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 illustrates different ways of traversing the lattice of FIG. 6.

DETAILED DESCRIPTION

Figure 1:
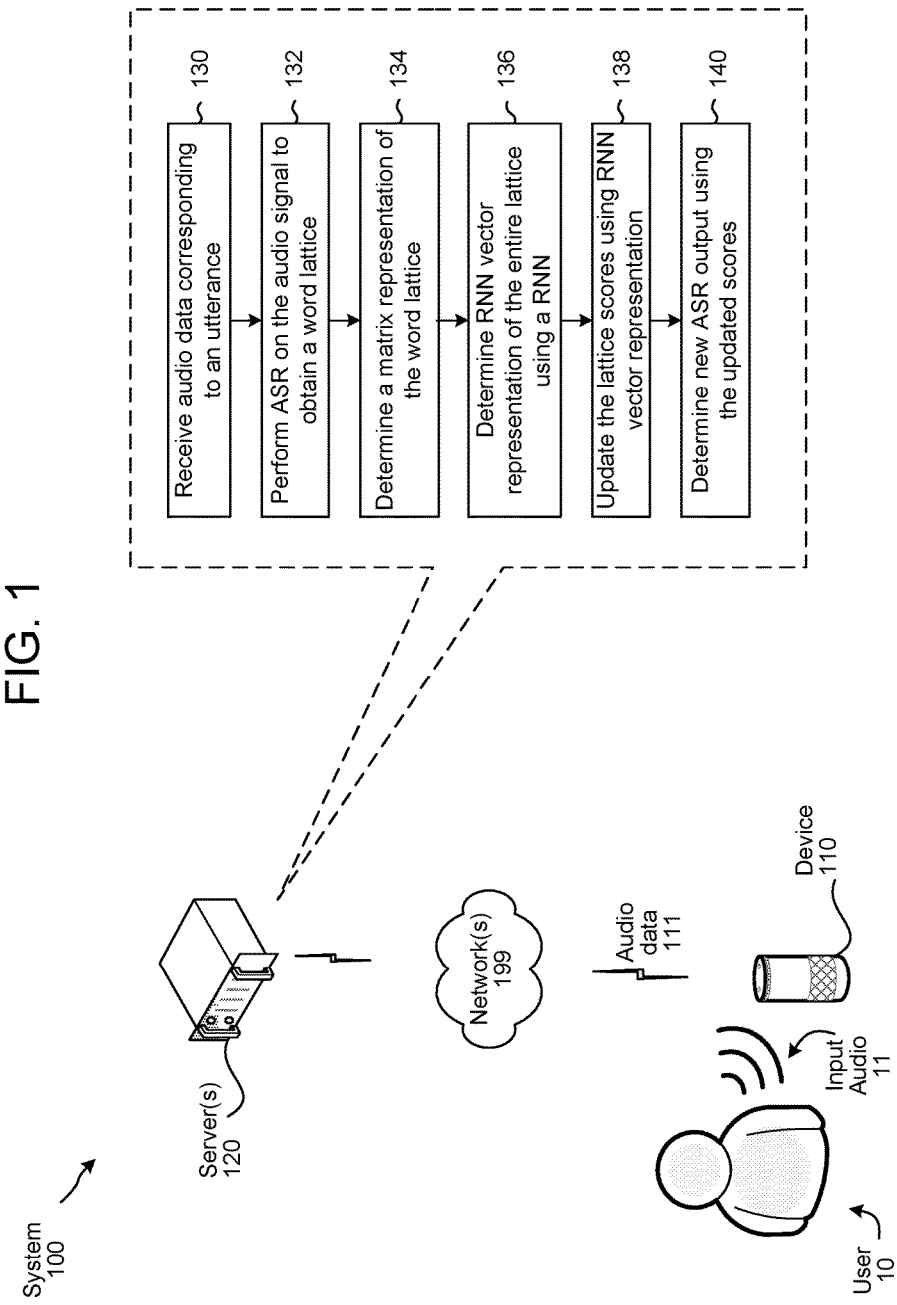
FIG. 1 shows a system configured to perform speech recognition using a recurrent neural network representation of a lattice according to one embodiment of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

Thus, during operation of a voice controlled system a user may speak an utterance to a voice controlled system at a local device, and audio data corresponding to the utterance may be sent to a remote device for further processing. In certain circumstances, the utterance may include a command for execution by some downstream component. For example, the user may ask the system to play a song. As can be appreciated, accurate transcription of the utterance to text as part of the ASR process is important to ensuring that the system executes the command as intended by the user.

As part of traditional ASR processing, the system may construct a word lattice (further discussed below) that represents possible word sequences (and sometimes corresponding probabilities) that may have corresponded to the input data. The system may then select the top scoring word string from this word lattice. Although a word lattice is used to represent a speech audio, other speech unit lattices may be used. For example, a phoneme lattice, senon lattice, or other phonetic unit lattice derived from the speech audio may be used. The word lattice may be a directed acyclic graph representing potential words that may correspond to incoming audio. The lattice may be traversed by sequentially processing incoming audio segments and trying to match those segments to sounds/words. As part of the ASR processing the system assigns scores to words of the word lattice. The scores represents the likelihood that the respective words correspond to the audio data for that time. After constructing the lattice the system may output a top N list of answers (for example, top 3 answers) that represent the top scoring word strings that likely correspond to the original input utterance. Often, however, there are many similar words between the different top N answers, with only slight differences between the final text. For example, the top 3 answers for a particular utterance may include "I'd like a hand," "I'd like a ham," "I'd lick a ham."

Sometimes it may be desirable to perform a check of the ASR results to confirm their accuracy, or otherwise evaluate the ASR performance. One drawback to doing so using only the top scoring answer, or even the top scoring N-best answers, is that some of the internal ASR computations are lost when only evaluating the answers. Further, any evaluation at more than one result created by the ASR process may be computationally inefficient due to the overlap in the top N results (e.g., for the example above, evaluating whether the text "I'd like" is correct might happen twice given that the same text appears in two of the top three answers).

Offered is a system that performs ASR processing in a multi-staged manner, and using more of the data determined during ASR processing, to ensure more correct results while reducing computational inefficiency and improving results. In the present system, a first pass at the ASR processing may actually output the resulting word lattice, in addition to (or instead of) simply outputting the top answer. The word lattice may include the different words, scores, paths and nodes, thus providing more information than a top N-best list. The system may then perform additional operations on the lattice (rather than on a list of top N answers), thus preserving the various data points such as words, scores, etc. originally determined by the first pass of ASR processing.

Specifically, the present system may convert the lattice into a matrix form, thus maintaining certain information included in the lattice that might otherwise be lost in an N-best list (paths, nodes, scores, etc.) while also placing the lattice in a form that may be manipulated by other components to perform operations such as checking ASR results. The matrix representation of the lattice may then be used for further operations in a manner that provides more robust results (due to the more full representation of the lattice in the matrix) and reduces computational inefficiency (as a result of avoiding repetitive calculations involving the same word as might be found in multiple N best answers).

Further, the matrix representation of the lattice may be transformed into a numerical representation such as vector representation by calculations performed using a recurrent neural network (RNN) or other recurrent component. An RNN is a tool whereby a network of nodes may be represented numerically and where each node representation includes information about the preceding portions of the network. For example, the RNN performs a linear transformation of the matrix which converts the matrix into a vector. The resulting vector maintains features of the matrix in reduced vector space that can otherwise be arbitrarily long. By representing the ASR lattice as a vector the system may perform additional operations, such as ASR results confirmation, on the lattice as a whole using the vector representation of the lattice.

Representing an ASR lattice as a vector using an RNN, however, involves several challenges due to the different nature of lattices and vectors. One challenge is that lattice arcs are typically time asynchronous, thus resulting in a lattice where different paths may be associated with a same moment in time from received audio, but without any link to that particular moment in time. This makes it difficult to simply input lattice data as a sequence of time. To account for this, time stamp data (indicating a moment in time or a window of time), or other time data may be associated with each arc and/or node of an ASR lattice and incorporated in the vector representation of the lattice. The time data may represent a time of the audio data (i.e., capture time, receive time, etc.) associated with the particular arc and/or node. Thus the vector representation of the ASR lattice may incorporate some time data.

One further problem in representing an ASR lattice as a vector using an RNN is the linear nature of an RNN, where a lattice is less linear (for example a particular node may be reached through more than one arc). To account for this, the present system may use a combination function (such as a pooling function) to represent speech recognition at a stage of the lattice (such as a node), which is reached using different paths of the lattice. The combination function may determine a speech recognition result at the node based on combining speech recognition results for a first path and a second path. For example, the two speech recognition results may be added and an average of the sum may be determined. Other combination techniques/poolings may also be used. The result of the combination will still keep the recurrent (i.e., backward looking) nature of the node representation as the combination result for the node is based on each of the paths to reach the node, thus incorporating, for example the lattice representation of the first path (which is based on previous portions of the lattice (i.e., ASR results) leading to the first path) and the lattice representation of the second path (which is based on previous portions of the lattice (i.e., ASR results) leading to the second path).

The vector representation of the ASR lattice created using the RNN may then be used for various purposes, such as correcting (or ensuring the correctness of) one or more hypotheses generated by the ASR processing. To do so, an output ASR lattice (or rather the vector representation of the same) may be processed using a trained machine learning model to update certain information (e.g., scores) included in the lattice during the original pass of ASR processing. Thus, the scores assigned after the first pass at the ASR processing may be updated during a second pass at the ASR processing which uses the original lattice results and a model trained on vector representations of lattices to determine an improved sequence of words that represent the sounds from the user. For example, during the ASR processing at the RNN, the scores from the first pass of the ASR processing are updated by conditioning the present word on all previous words. For improved updates, the combination techniques/poolings may be used for a node that receives two or more words from different starting nodes.

FIG. 1 shows a system 100 configured to perform speech recognition with a neural network according to one aspect of the disclosure. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, a device 110 receives an audio input 11 corresponding to a spoken utterance from the user 10. The device 110 may convert the audio 11 into audio data 111 and send the audio data to the server(s) 120. A server(s) 120 may then receive the audio data 111 corresponding to the spoken utterance via the network 199, as shown in block 130. The server 120 performs the first pass of the ASR processing on the audio data 111 to obtain a lattice, as shown in block 132. The lattice is converted to a form (e.g., matrix) recognizable by the recurrent neural network (RNN), as shown in block 134. A matrix may include a combination of vectors. The RNN may be implemented using a second server that is different from the first server. As part of the second pass of the ASR processing, the second server uses an RNN to determine an RNN vector representation of the lattice, as shown in block 136. The RNN may include a trained model (e.g., acoustic model, language model, etc.) used to update the lattice scores, as shown in block 138. The second server then determines RNN vector representation, which is a new ASR output using the updated scores, as shown in block 140. The new ASR output may represent a new top answer or may represent a new top N best result list of the ASR lattice incorporating the updated scores.

Figure 2:
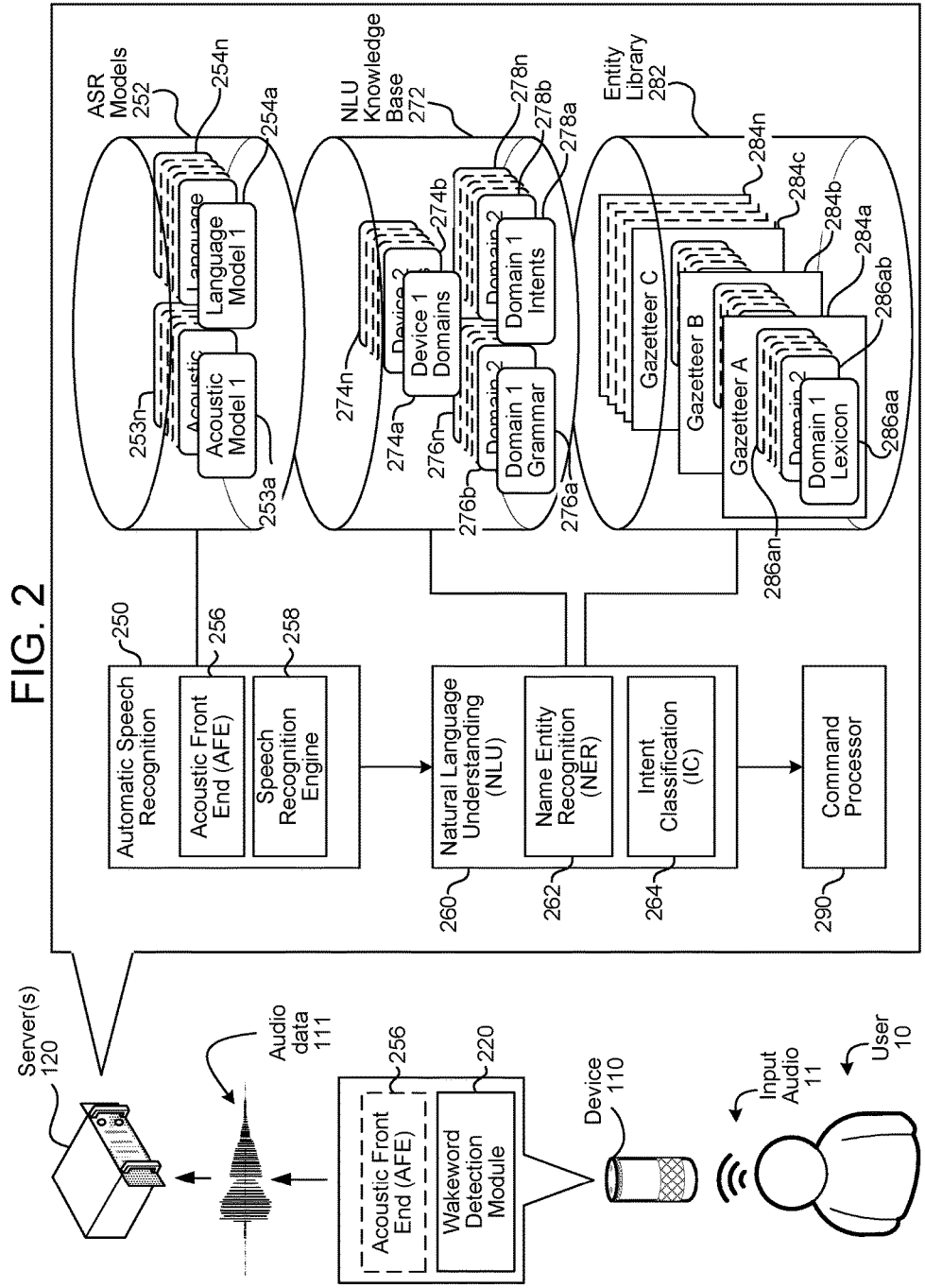
FIG. 2 is a conceptual diagram of a speech processing system according to embodiments of the present disclosure.

Further details of performing speech recognition at the RNN are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (MINI) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recurrent neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge exchange 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge exchange 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge exchange 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
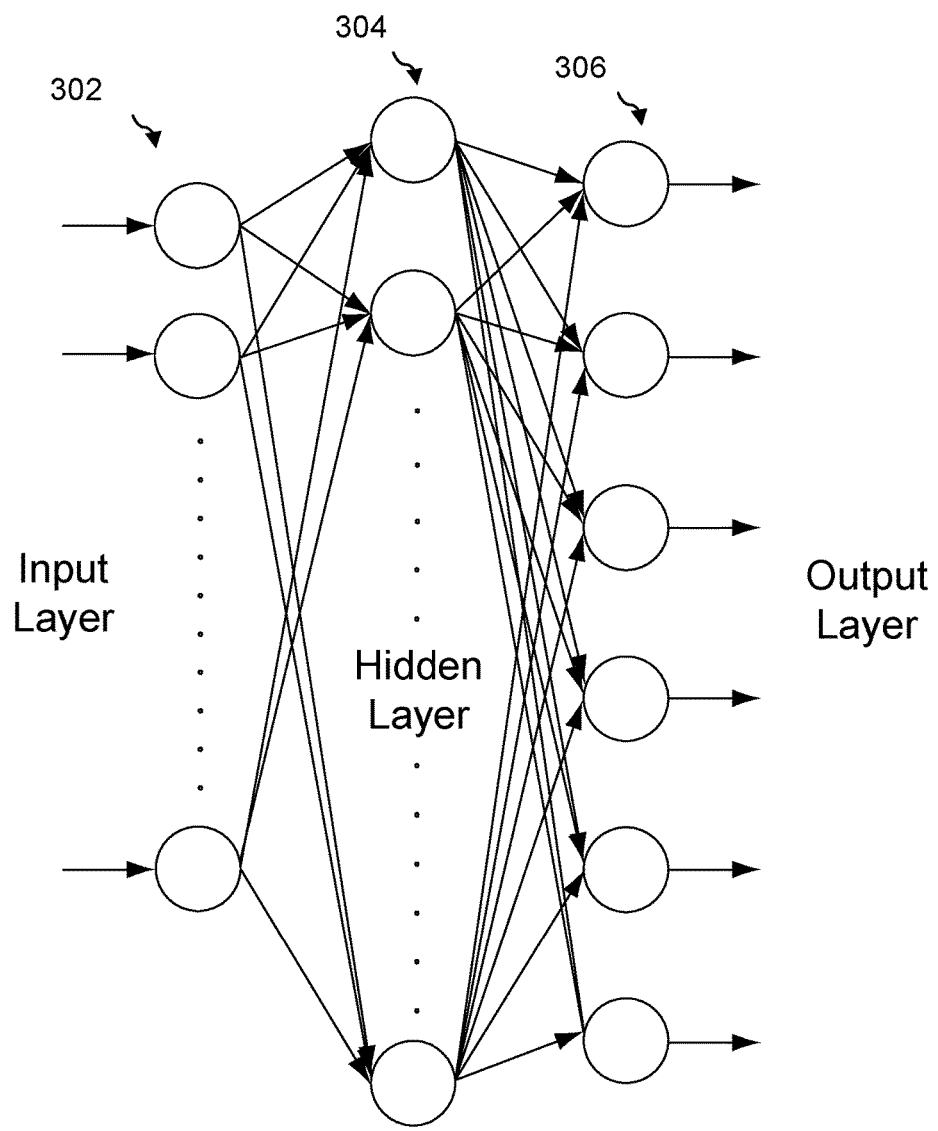
FIG. 3 illustrates a neural network for speech recognition according to one embodiment of the present disclosure.

Neural networks may be used to perform ASR processing including acoustic model processing and language model processing. An example neural network for ASR is illustrated in FIG. 3. A neural network may be structured with an input layer 302, a middle layer 304, and an output layer 306. The middle layer may also be known as the hidden layer. Each node of the hidden layer is connected to each node in the input layer and each node in the output layer. Although illustrated in FIG. 3 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 4:
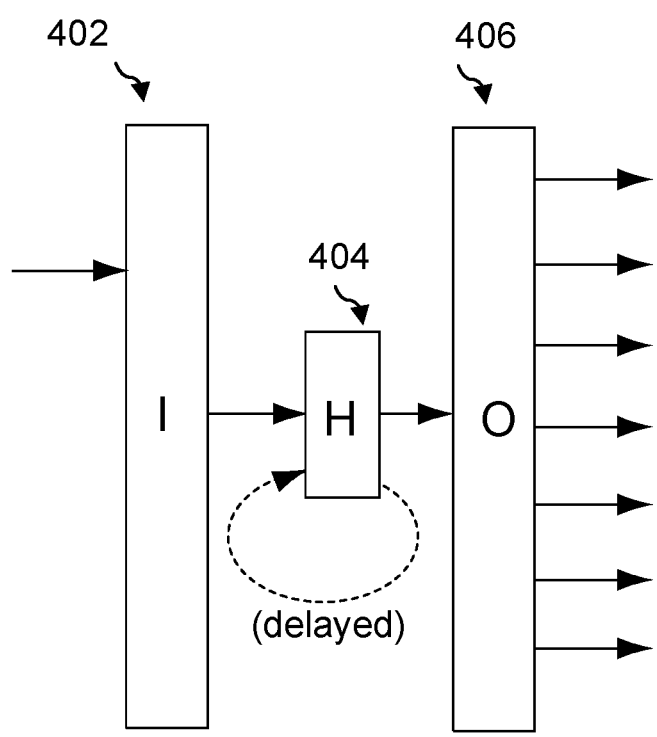
FIG. 4 illustrates a neural network for speech recognition according to one embodiment of the present disclosure.

In one aspect, the neural network may be constructed with recurrent connections such that the output of the hidden layer of the network feeds back into the hidden layer again for the next set of inputs. Such a neural network is illustrated in FIG. 4. Each node of the input layer 402 connects to each node of the hidden layer 404. Each node of the hidden layer 404 connects to each node of the output layer 406. As illustrated, the output of the hidden layer 404 is fed back into the hidden layer for processing of the next set of inputs. A neural network incorporating recurrent connections may be referred to as a recurrent neural network (RNN).

In the case where an acoustic model uses a neural network, each node of the neural network input layer may represents an acoustic feature of a feature vector of acoustic features, such as those that may be output after the first pass of performing speech recognition, and each node of the output layer represents a score corresponding to a subword unit (such as a phoneme, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 4, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

To further detail use of lattices with RNNs and in hypothesis correction, some further data is provided below regarding detailed operation of the speech recognition engine 258.

As noted above, during speech recognition, an ASR module 250/speech recognition engine 258 may utilize acoustic models 253 to determine possible phonemes or other phonetic units that match the incoming audio data feature vectors. The probable phonemes and related states/state transitions may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5:
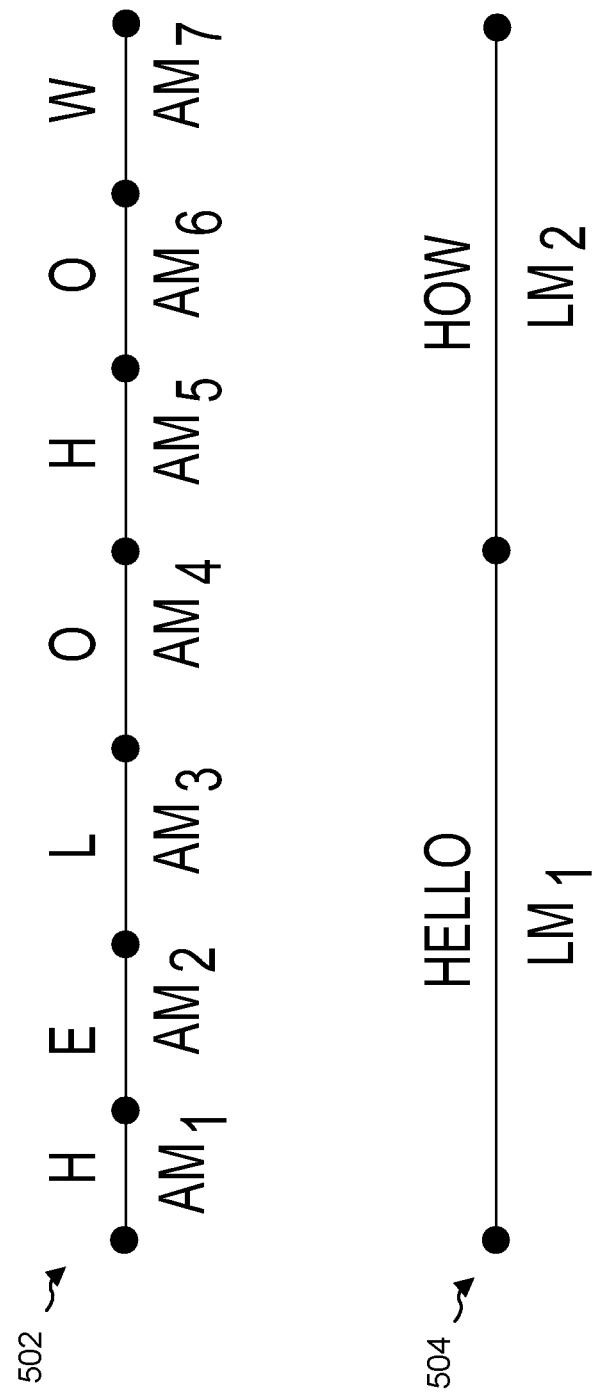
FIG. 5 illustrates phoneme processing and word processing according to one aspect of the present disclosure.

FIG. 5 illustrates the relationship between acoustic modeling and language modeling. As illustrated, each processed phoneme included in the path 502 is associated with an acoustic model score $AM_1$ through $AM_7$. The language model is then applied to associate each word in the path 504 with a language model score $LM_1$ or $LM_2$.

As part of the language modeling (or in other phases of the ASR processing) the speech recognition engine 258 may, to save computational resources, prune and discard low recognition score states or paths that have little likelihood of corresponding to the spoken utterance, either due to low recognition score pursuant to the language model, or for other reasons. Such pruned paths are considered inactive. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are considered active hypotheses.

Figure 6:
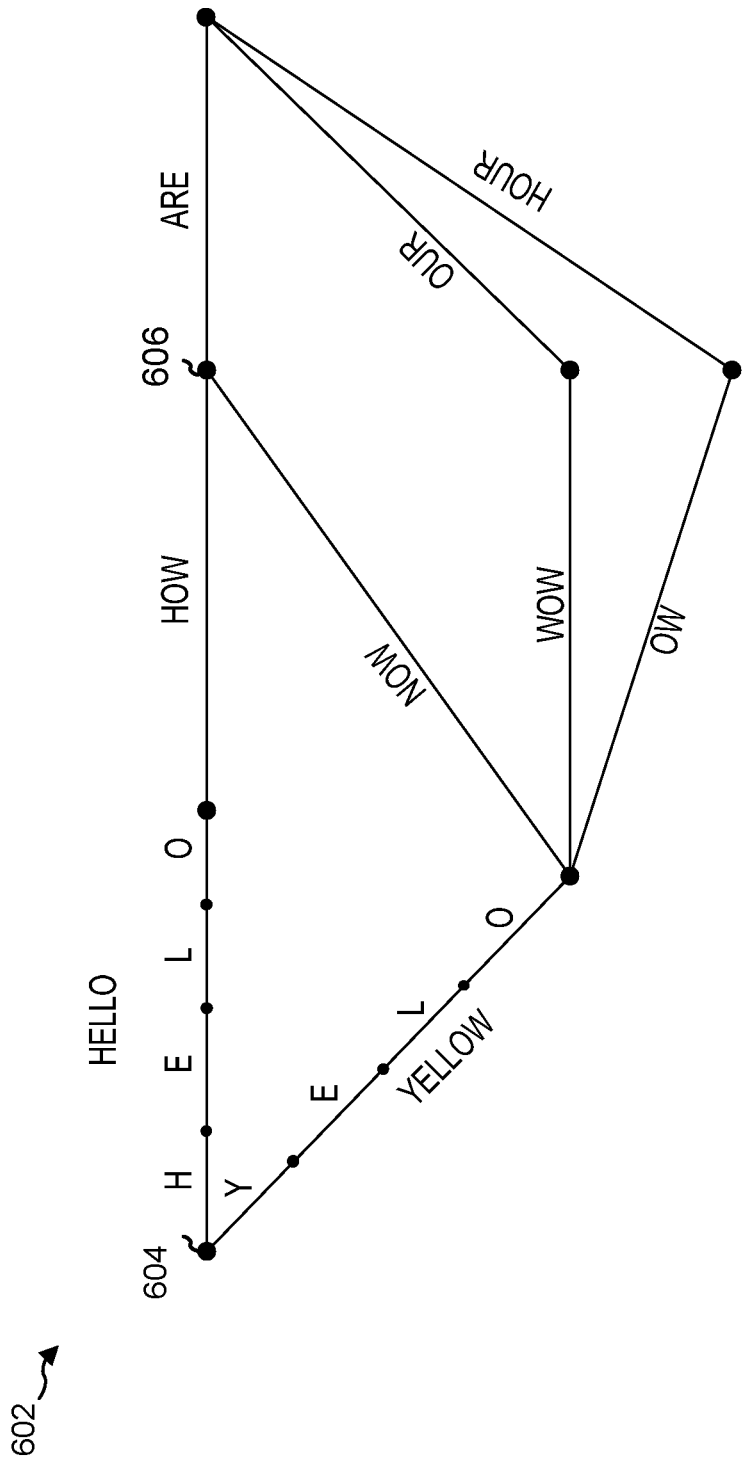
FIG. 6 illustrates a speech recognition lattice according to one aspect of the present disclosure.

The speech recognition engine 258 may combine potential paths into a lattice representing speech recognition results. A sample lattice is shown in FIG. 6. The lattice 602 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 604 and node 606 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated feature vectors.

Different arcs may also be associated with the same time data. For example, the arc "hello" may be associated with time data for a first group of acoustic frames that were processed by the speech recognition engine 258 to traverse the arc corresponding to "hello." The arc may be an indication that a first node is connected to a second node, where the first node may be the originating node and the second node may be the terminating node. The indication may be associated with a first word. For example, lattices include arcs that connect one node to another node. The same time data may also be associated with the arc "yellow" as the same first group of acoustic frames were processed to traverse the arc "yellow" as the arc corresponding to "hello," that is the speech recognition engine 258 determined two potential words that may correspond to that first group of acoustic frames. The time data may be associated with those arcs for purposes of a matrix/vector representation of the lattice 602.

Figure 8:
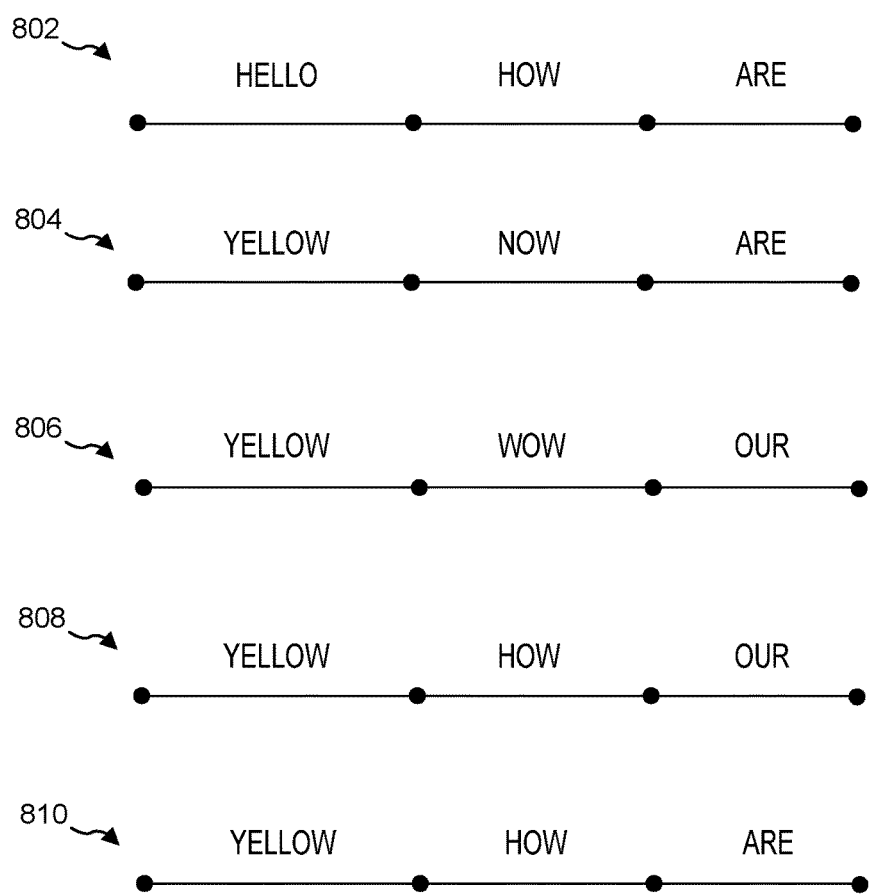
FIG. 8 illustrates an N-best list of hypotheses associated with the lattice of FIG. 6.

Illustrated in FIG. 7 are different potential paths along the lattice 602. As shown in FIG. 7, path 702 results in "hello how are," path 704 results in "yellow now are" and path 706 results in "yellow wow our." As can be seen, many such paths are possible even in the small example lattice 602. An example of such paths 802-810 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component may output an N-best list, such as the list of potential results shown in FIG. 8, may output a single top scoring answer (e.g., 802) or may output an entire lattice. The discussion below focuses on an ASR output of a lattice, and how that lattice may be represented in a matrix/vector representation form for further downstream operations, such as ASR hypothesis correction.

Figure 9A:
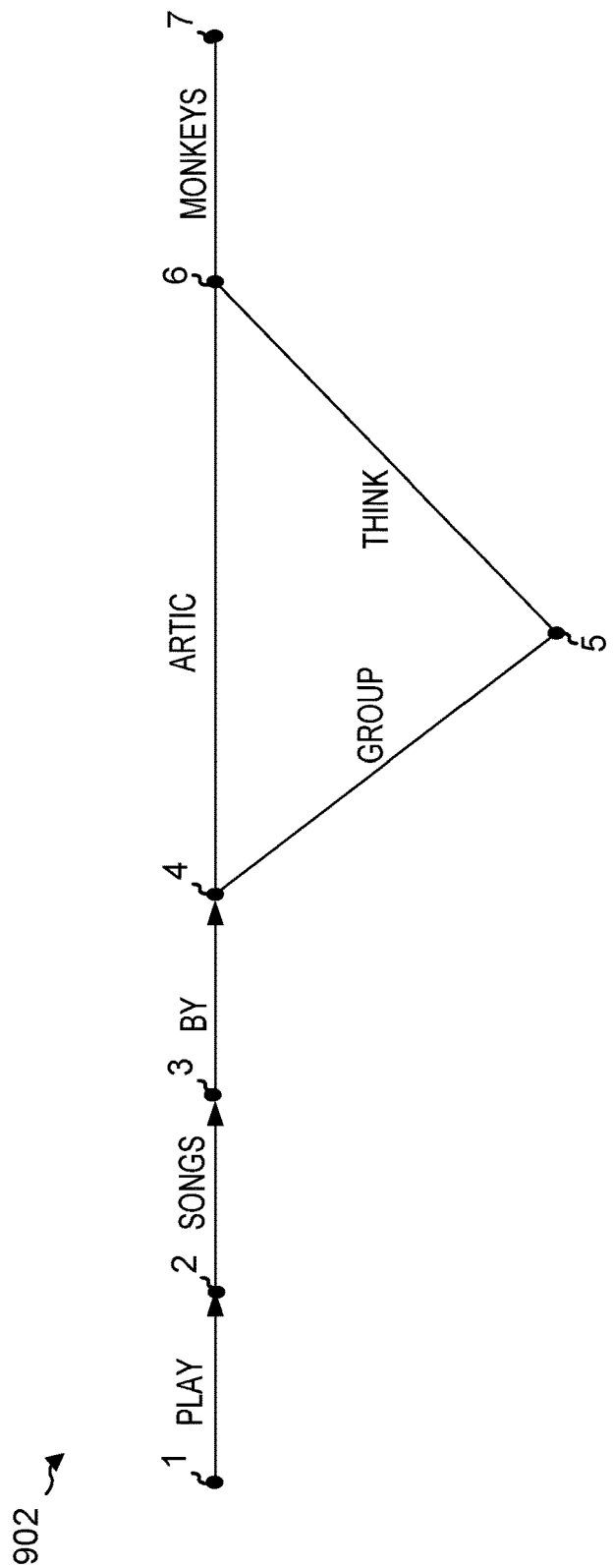
FIG. 9A illustrates an exemplary speech recognition lattice to be processed using a recurrent neural network according to embodiments of the present disclosure.

FIG. 9A illustrates another example of a slightly simplified speech recognition word lattice which may be represented as a matrix/vector representation using a recurrent neural network. The lattice portion 902 may be an example of an ASR lattice that results from a first pass of the ASR processing. Although a typical ASR lattice may include a large number of potential paths, for purposes of illustration, lattice portion 902 illustrates two potential paths of speech recognition results. For example, a first path of the lattice portion 902 includes a first node (1), a second node (2), a third node (3), a fourth node (4), a sixth node (6) and a seventh node (7). A second path of the lattice portion 902 includes the first node (1), the second node (2), the third node (3), the fourth node (4), the fifth node (5), the sixth node (6) and a seventh node (7). Each arc between nodes represents a respective potential word (for example "play" between nodes 1 and 2, "songs" between nodes 2 and 3, etc.) Each arc originates at a first node (e.g., node 1) and terminates at a second node (e.g., node 2). Each arc represents a word in the lattice. Each arc may also be associated with various data values including a score, time data (which may corresponding to received audio vector representations), or other data.

The difference between the first path and the second path occurs between nodes 4 and 6. Specifically, the two path choices between node 4 and node 6 represent potential word choices, "artic" (represented by an arc from node 4 to node 6) or "group think" (represented by one arc from node 4 to node 5 and another arc from node 5 to node 6). Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned after the first pass of performing the ASR processing as the ASR result for the associated vector representations. The first pass of performing the ASR processing may also return a lattice or an N-best list of paths along with their respective recognition scores, corresponding to the top N paths.

Aspects of the present disclosure are directed to being able to preserve ASR processing results in a form that can later be reused (for result checking or other operations) in manner that reduces computational inefficiency and improves results of those downstream operations. To do this, the present system takes an ASR lattice and represents the lattice in a vector representation form that can be operated on by downstream processes. The example lattice of 902 is used to illustrate this process. An exemplary output from a first pass of the ASR processing is represented in the form of the lattice portion illustrated in FIG. 9A. The lattice portion 902 may be defined in accordance with a topological order to process the entire lattice portion 902 at a neural network (e.g., the RNN of FIG. 4) while avoiding redundant ASR processing of words common to the first path and the second path. Topological ordering of the lattice portion 902 is a linear ordering of nodes such that for every arc originating from a first node and terminating at a second node, the first node comes before the second node in the ordering. Thus node 1 of the lattice portion 902 comes before node 2 and node 2 comes before node 3 and so on. One example of a topological ordering of lattice portion 902 may be expressed as shown in Table 1:

TABLE 1

| Start node | End node | Word |
|---|---|---|
| 1 | 2 | play |
| 2 | 3 | songs |
| 3 | 4 | by |
| 4 | 6 | arctic |
| 4 | 5 | group |
| 5 | 6 | think |
| 6 | 7 | monkeys | where each line of Table 1 represents an arc of the lattice portion, and each line indicates the starting node of the arc, ending node of the arc, and word associated with the arc. Thus, the lattice is represented by the data in the table. The first arc is represented by the indication in the table that node 1 is connected to node 2 over an arc and the word "play" is associated with that representation/arc. The second arc is represented by the indication in the table that node 2 is connected to node 3 over another arc and the word "songs" is associated with that representation/arc. Other columns can also be envisioned where other data such as score, time, etc. may be included, for example as shown in Table 2:

TABLE 2

| Start node | End node | Word | Score | Time (in audio frame numbers) |
|---|---|---|---|---|
| 1 | 2 | play | .63 | 0-12 |
| 2 | 3 | songs | .59 | 13-24 |
| 3 | 4 | by | .70 | 25-33 |
| 4 | 6 | arctic | .43 | 34-60 |

TABLE 2-continued

| Start node | End node | Word | Score | Time (in audio frame numbers) |
|---|---|---|---|---|
| 4 | 5 | group | .23 | 34-45 |
| 5 | 6 | think | .33 | 46-60 |
| 6 | 7 | monkeys | .65 | 61-92 |

The values of the tables (e.g., the table without the top descriptive row) may be used to create a matrix representation of the lattice portion, where the matrix portion includes the indications of individual arcs between nodes and the associated individual values of data corresponding to each of the arcs. Other data values beyond those illustrated above may also be included in the matrix representation of the lattice portion. Each row of the table/matrix may also be represented as a vector, where each vector representation corresponds to an arc of the lattice portion (and includes corresponding data). Vector representations may be created for nodes of the lattice portion as well. The vector representations may be combined into a matrix representation that may be used, as noted below, to determine an RNN representation/encoding of the lattice portion.

To process the portion lattice portion 902 using an RNN encoder, the lattice portion 902 (and the accompanying data associated with the lattice and with the arcs and nodes of the lattice) is converted to a form (e.g., the matrix form) that can then be processed by the encoder (e.g., an RNN) to encode the lattice as a vector representation. Thus, an encoding technique such as the RNN or any other recurrent encoding techniques may be implemented to encode the lattice portion 902. The RNN encoder is an RNN configured to input a first (e.g., matrix) representation of a lattice and to output a second (i.e., encoded vector) representation of the lattice. The RNN encoders inputs the string or sequence of words (and the accompanying data associated with the lattice and with the arcs and nodes of the lattice) of the lattice portion 902 and outputs a multi-dimensional vector representation of the lattice portion. For example, the lattice portion 902 may be mapped into a fixed dimensional (e.g., N) vector such as a 100 dimensional encoded vector. The encoded vector representation is a multi-dimensional numerical representation of the lattice portion where each dimension represents some characteristic of the lattice portion. The encoded vector may be later decoded using a decoder/classifier that is trained to decode vector representations of lattices. By encoding a lattice representation with the RNN encoder, the system is able to create an encoded vector that represents various aspects of the lattice in a single data structure. That data structure thus represents not only the top scoring path of the lattice, but also represents (and thus preserves) certain details of the inner workings of the lattice. Preservation of that level of detail of the lattice may be useful in downstream operations such as confirmation of results, retraining, etc.

To perform the encoding by the RNN, the lattice portion 902 is converted into a matrix. Converting the lattice portion 902 into a matrix may include converting each arc representing each word of the lattice portion 902 and each node of the lattice portion 902 into a numerical representation that can be included in the matrix. The system can then use an RNN to process the matrix (called encoding the matrix), the result of which will be a fixed-size vector that represents each final node of the lattice. As each final node will include information about the nodes preceding the respective final node, the vector representation thus will effectively represent the entire lattice and all the included data (scores, words, etc.). For example, for the lattice portion 902, the data encoded for node 7 (the only final node in lattice portion 902) will include information about the entire lattice portion 902. Further downstream operations can thus use the vector representation including data encoded for node 7 as a representation of the entire lattice portion 902.

Encoding of the lattice portion 902 may happen node by node. Specifically, encoding the lattice portion 902 at each node may involve projecting a sequence of feature values (e.g., values for a word, score, metadata, time, etc.) of the lattice into a vector space. For example, at a given node, a vector representation for that node is determined based on the lattice portion 902 traversed up to that node. The vector representation is a fixed size representation of the sequence of features of the lattice portion 902 that can otherwise be arbitrarily long. The size is fixed for each node for ease of processing.

The vector representation for specific node of a lattice is thus based on all previous vector representations of previous nodes leading up to the specific node. To condition the vector representation of the current node on previous vector representations of previous nodes, the RNN incorporates some data of vector representations already processed by the RNN along the path leading to the specific node. This backward looking data of previous vector representations is then used to determine the next vector representation. For example. the determination of the next vector representation is based on previous vector representations and not just on the most recent feature (e.g., word, score, etc.) Thus, the determination of the vector representation of node 2 is based on a vector representation of node 1.

Similarly, the determination of the vector representation of node 3 is based on the vector representation of node 2. Thus, the vector representation of node 3 is based on both the vector representation of node 1 and the vector representation of node 2 even though the vector representation of node 3 is not itself directly conditioned on the vector representation of node 1 (rather the vector representation of node 3 incorporates information about node 1 through the vector representation of node 2). To condition vector representations on previous vector representations, a previous vector representation at an output of the hidden layer 404 (e.g., an internal output of the RNN) is fed back into the hidden layer (e.g., an internal input of the RNN). The previous vector representation is then used to process the next set of inputs for determining the vector representation of a current node. Thus, the previous vector representation is used in conjunction with a current input (e.g., word, score, etc.) to determine the vector representation of the current node. For example, for node 3, an internal input of the RNN receives the vector representation of node 2 from an internal output of the RNN. The RNN then combines the vector representation of node 2 with the current set of inputs (word, score, metadata, etc.) for determining the vector representation of node 3.

Some nodes of the lattice portion 902, however, are shared between two or more words. For example, the word "artic" is represented by the arc between nodes 4 and 6, in which the word arc originates from node 4 and terminates at node 6. The word "think" is represented by the arc between nodes 5 and 6, in which the arc of the word originates from node 5 and terminates at node 6. Although the originating nodes (i.e., node 4 and node 5) of these word arcs are different, the terminating node (node 6) is shared between these two word arcs. To overcome the challenges presented when performing ASR processing at node 6, the RNN encoder uses a combination function (e.g., a pooling function) to determine the vector representation of node 6.

The RNN encoder may determine the vector representation up to node 6 based on a combination of the vector representation up to node 4 and the vector representation up to node 5 using the combination function. Of course, the vector representation up to node 5 is directly conditioned on the vector representation up to node 4 and indirectly conditioned on all other previous nodes of the second path (e.g., nodes 1, 2 and 3). The vector representation up to node 4 is directly conditioned on the vector representation up to node 3 and indirectly conditioned on all other previous nodes of the first path (e.g., nodes 1 and 2). Because of the conditioning and the combination, the resulting vector representation up to node 6 maintains an increased number of features in the lattice portion 902 that might otherwise be lost. The vector representation of the entire lattice portion 902 is determined at the final node, which in this case is node 7. The vector representation of the entire lattice portion 902 can be used to perform additional operations including ASR correction. For example, the vector representation of the entire lattice portion 902 is output through an external output of the RNN while all other vector representations of previous nodes are output through an internal output and fed back to an internal input of the RNN.

An example function for implementing the combination is illustrated in the following equations. For example, the combination function is illustrated in equation 1. Equations 1 and 2 represent the forward pass at the RNN while equations 3, 4, and 5 represent the backward pass at the RNN.

$$\vec{S}_s = f_{pool}(\vec{A}_a \in deps_{fs}) \qquad (1)$$

$$\vec{A}_a = g(\vec{Z}_a + W_x^T \vec{S}src_a) \qquad (2)$$

$$\delta_S^s = f_{pool}^*(\delta_A^a \in deps_{bs}) \qquad (3)$$

$$\delta_Z^a = (\delta_A^a + W_r^T \delta_s^{dest_a}) * g'(\vec{A}_a) \qquad (4)$$

$$\delta_{W_{i,j}} = \sum_{a \in arcs} \delta_{Z_i}^a \vec{S}_j^{src_a} \qquad (5)$$

where $\vec{S}_s$ is a representation of the states or nodes;

$\vec{A}_a$ is a representation of an arc of the lattice;

$deps_{fs}$ is a set of incoming arcs into a state or node such as state "s" (forward dependencies for state "s");

$deps_{bs}$ is a set of outgoing arcs from a state "s" (backward dependencies for state "s");

$\vec{S}src_a$ is a representation of the originating node or source state of an arc (e.g., arc "a");

$\delta_s^{dest_a}$ is a gradient for a destination state or node of arc "a";

$f_{pool}$ is a pooling function or pooling operator defined by the RNN;

$f_{pool}^*$ is a backprop of pooling operator;

$W_x^T$ is a weight matrix for the input to the RNN;

$W_r^T$ the recurrent weight matrix; and

G is an activation function.

As can be appreciated, the RNN including the encoder and other models used to operate on vector representations of lattices may be trained using example lattices/vector representations of those lattices. Additionally, a device for performing NLU processing (e.g., server 120) including various components (e.g., classifiers) used to operate on vector representations of lattices (output from the RNN) may be trained using example lattices/vector representations of those lattices. To improve performance of neural networks the trained classifier is connected back to the RNN to further train the RNN to achieve a better representation for a classification task. The Various machine learning techniques may be used to perform the training of the classifier(s) and models. Models may be trained and operated according to various machine learning techniques. Such techniques may include, for example, neural networks (such as deep neural networks and/or recurrent neural networks). The training data for such training may include example vector representations of lattices, corresponding post-ASR lattices, audio data, etc. Different encoders may be trained for different tasks, for example one RNN encoder may be trained for a first task (such as ASR correction) while another RNN encoder may be trained for a second task. Thus an encoder is trained to learn the representations (vectors) that are desirable for different classification tasks.

ASR Correction

One use of a vector representation of an ASR lattice is hypothesis or ASR correction. That is, a vector representation of an ASR lattice may be used to check the results of the initial ASR processing that led to the lattice in the first place. As part of the first pass of ASR processing to generate a lattice, the probabilities for the different paths of the lattice are calculated. The probabilities are assigned scores (e.g., acoustic and language model scores) that reflect whether the result of the ASR processing is correct. The ASR processing using the RNN encoded representation of the lattice (i.e., second pass ASR processing) may be used to verify whether the ASR output from the first pass is correct. One way to ensure a better ASR result for the audio signal is by updating information in the lattice from the first pass. The updated information may include the assigned scores and other ASR processing data for the lattice and/or matrix representation of the lattice. For example, the encoding of the lattice portion 902 by the RNN may be used to update the scores associated with each arc from the first pass of ASR processing that resulted in the original lattice that was encoded. For example, an updated vector representation of final node 7 includes vector representations of scores updated from lattice portion 902. Following updating of the scores, a new top-scoring hypotheses may be generated in accordance with the updated scores used to rescore the existing ASR lattice portion 902. Thus, the updated vector representation of the lattice portion 902 may be decoded to generate a rescored ASR lattice portion 902 from which a 1-best ASR hypothesis can be directly generated or used to select the best hypothesis from the original lattice portion 902. The new top hypothesis generated from the rescored lattice may not be the same as the top hypothesis from the lattice determined at the first pass.

To decode the encoded vector representation of a lattice (for example of lattice portion 902), a trained RNN decoder may be used. The RNN decoder is an RNN configured to input a first (i.e., encoded vector) representation of a lattice and to output a second (e.g., matrix) representation of the lattice. The decoder is thus trained to take encoded vectors and process them to obtain a lattice (i.e., operate in a reverse manner from the RNN encoder). The RNN decoder receives as an input of the encoded vector representation of the lattice portion 902. The encoded vector representation is thus decoded by the trained decoding RNN to generate a rescored ASR lattice portion 902'. The rescored ASR lattice portion 902' may include some words that are common between the existing ASR lattice portion 902 and the rescored ASR lattice portion 902' but may also include some words that are not included in the original ASR lattice portion 902.

To operate the decoding, the inputs to the RNN decoder include the encoded vector representation of the lattice and representing representation of the previous node processed by the RNN decoder (which may be an indicator of a null node if the RNN decoder has not yet decoded any of the encoded vector). The RNN decoder may also be provided with other inputs. For example, for an encoded vector corresponding to an ASR lattice, the RNN decoder may also consider a word lexicon or other ASR resource for purposes of constructing an updated lattice as part of the decoding. Other inputs may also be provided for various decoding tasks. For the RNN decoder to start processing, the input representing the previous node processed is a start indication symbol (which may be representative, for example of node 1, i.e. the first node of the resulting rescored lattice portion 902'). Thus, for example, when the decoder starts decoding, it is provided the encoded vector representation and the start indication symbol. The output of the RNN decoder for this first pass is a representation of the second node (e.g., node 2) of the rescored ASR lattice portion 902' along with other information about the arc between node 1 and node 2, the score of the arc, the word of the arc, etc.

The first word output by the first pass of the decoder may be a word that already exists in ASR lattice portion 902 (e.g., play) (though potentially with a different score) or may be a new word entirely. For example, decoding by the trained RNN decoder involves obtaining words from a word lexicon associated with the RNN decoder. As part of the decoding, the RNN decoder can match a particular pass using the vector representation of the lattice (and the input node data) to a word in the lexicon that may not necessarily match the word that appeared in the original lattice at the particular location.

On the next step of the decoding the RNN decoder may take as an input the data related to node 2 and the encoded vector representation of the lattice portion 902. Thus, after the first word is decoded, a second word (e.g., songs) is then decoded based on the encoding of the lattice portion 902 and the first word. For example, the first word and the encoding of the lattice portion 902 may be fed into an internal input of the RNN decoder and both inputs are used to determine the second word/node. Similarly, a third word may be determined based on the second word and the encoding of the lattice portion 902, and so on until an end indication symbol is provided, which indicates the end of the decoding. Multiple words representing multiple paths may be decoded. For example, the process for decoding the first word may be repeated for each of the multiple first words and the process for decoding the second word is repeated for one or more second words following the multiple first words and so on until the end indication symbol is encountered.

As part of the decoding, certain decoded words/arcs/nodes may be pruned based on a probability threshold. For example, the score of each word (corresponding to the probability of the word) obtained from the encoding of the lattice portion 902 is compared to the probability threshold. Words that have a score below the probability threshold may be pruned. The rescored ASR lattice portion 902' resulting from the decoding may be the different from the original ASR lattice portion 902. A first overall score may be assigned to the rescored ASR lattice portion 902' and a second overall score may be assigned to the original ASR lattice portion 902. These scores represent weights for their respective lattices when determining which ASR results (either the original or the rescored) should be considered more heavily in downstream applications). The first overall score or weight and the second overall score or weight may be determined based on results obtained from training the RNN decoder. For example, the first and the second overall weights are the weights that achieve accurate hypothesis or lattices during training.

As a way of merging the original ASR results with the rescored ASR results, a lattice union may be formed with the rescored ASR lattice portion 902' and the original ASR lattice portion 902. For example, the rescored ASR lattice portion 902' may be combined with the original ASR lattice portion 902 to determine a new lattice or hypothesis with modified scores and words. In one aspect, words that are shared between the rescored ASR lattice portion 902' and the original ASR lattice portion 902 may be represented in the new lattice with an increased score. Such a score may be determined by adding the score of the shared word in the original ASR lattice portion 902 and the score of the shared word in the rescored ASR lattice portion 902'. In some aspects, prior to adding the scores of the shared word, the score of the shared word in the original ASR lattice portion 902 is multiplied by the second overall score corresponding to the original lattice portion 902. Similarly, the score of the shared word in the rescored ASR lattice portion 902 is multiplied by the first overall score. Words that are only in the original ASR lattice portion 902 may be added to the new lattice with their original score or a different score. The different score may be the original score multiplied by the second overall score. Words that are only in the rescored ASR lattice portion 902 may be added to the new lattice with their updated score or a different updated score. The different updated score may be the updated score multiplied by the first overall score.

Thus, a 1-best ASR hypothesis or a top scoring lattice may be selected from the new lattice that is a combination of the original lattice and rescored lattice. For example, the 1-best ASR hypothesis or a top scoring lattice may be selected from the lattice union of the existing ASR lattice portion 902 and the rescored ASR lattice portion 902.

To perform the rescoring, the present system may use a RNN language model to determine a probability of a word, $w_1$, in a sentence (S=$w_1$, $w_2$ . . . $w_n$) based on the lattice portion 902 generated during the encoding by conditioning a current word on all previous words. The probability of a word in the sentence may be updated while performing ASR processing at each node as described herein. For example, the probability of a word at a current node may be conditioned on the probability of a word of the previous nodes, as illustrated in equation 6.

$$p(w_i|S)=p(w_i|w_{i-1}, w_{i-2}, \ldots, w_1) \quad (6)$$

where $p(w_i|S)$ is the probability of a word in a sentence; and $w_i|w_{i-1}, w_{i-2}, \ldots, w_1$ is a representation of an entire history of the lattice.

To condition current words on previous words, the RNN includes an internal input that receive a current word (e.g., a matrix representation of the current word) through an external input of the RNN. The internal input may also receive previous numerical representations in the form of an activation function representing all previous numerical representations of previous words from an internal output of the RNN. The combination of the current word and the previous words are used to determine the numerical representation of the current word by the RNN. The resulting numerical representation is output to an external output of the RNN when the current word corresponds to a final node of the lattice. Otherwise the numerical representation is output to an internal output of the RNN and subsequently fed back to an internal input of the RNN for determining a numerical representation of a next word. The activation function described here is a hidden layer activation function because it does not represent a final output of the RNN, which is the numerical representation of the final node. For example, an hidden layer activation $h_{i-1}$ is a representation of an entire history of the word, w up to the word $w_{i-1}$. A last hidden layer activation (e.g., $h_n$) corresponds to a numerical representation of the entire lattice.

To generate a corrected ASR hypothesis, the encoded lattice may be decoded using a decoder trained to generate an updated lattice portion, where the updated lattice may have the same arcs, nodes and words of the original lattice portion, but the scores are updated as a result of the encoding-decoding process. Thus, to generate a corrected ASR $$\hat{W}^j = \hat{w}_1^j, \hat{w}_2^j, \ldots, \hat{w}_m^j$$

the probability of a sequence W may be determined using the input lattice $L^i$ as shown in equation 7 below:

$$p(\hat{w}_1, \hat{w}_2, \ldots \hat{w}_m | L_i) = \prod_m p(\hat{w}_j | h(L^i), \hat{w}_{j-1}, \ldots \hat{w}_1) \quad (7)$$

Thus, the words, the nodes and the scores (for the determined probabilities) are converted into lattice portion 902 a matrix to obtain vector representations that are representative of the lattice portion 902 traversed up to the particular node. As part of the determination of the vector representation of at the nodes, the ASR scores are also updated. To update the score of a node that is shared between two or more different paths, a combination implementation using a combination function, described herein, may be applied. For example, to determine an updated score at node 6 (a shared node of the lattice portion 902) the RNN determines the vector representation at node 6 to obtain the updated score at node 6. The updated score is based on a combination of the vector representation at node 4 and the vector representation at node 5 and is determined using the combination function to combine both vector representations. The probability of an entire sentence of the lattice corresponds to a probability (or updated score) at the final node of the lattice (e.g., node 7), The vector representation and corresponding probability determined at that node is the external output of the RNN.

Figure 9B:
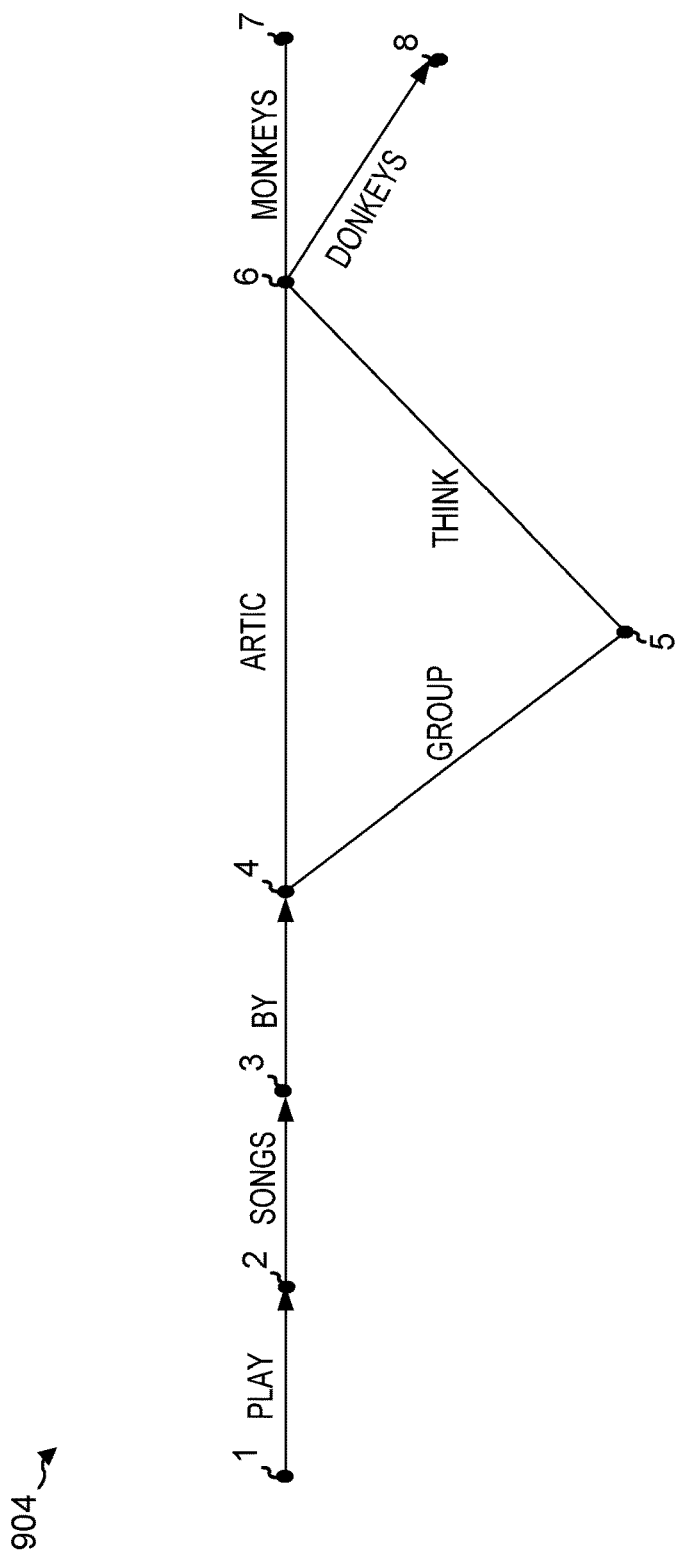
FIG. 9B illustrates an exemplary speech recognition lattice to be processed using a recurrent neural network according to embodiments of the present disclosure.

Sometimes the lattice can have multiple final nodes or states as illustrated in FIG. 9B. FIG. 9B illustrates a speech recognition lattice similar to the speech recognition lattice of FIG. 9A. FIG. 9B, however, includes a second final node (node 8). A word "donkey" is represented by the arc between node 6 and node 8 such that the arc of the word originates from node 6 and terminates at node 8. The addition of node 8 introduces two additional paths to the lattice portion 902 thus creating new lattice portion 904. For example, a third path of the lattice portion 904 includes node 1, node 2, node 3, node 4, node 6 and node 8. A fourth path of the lattice portion 904 includes node 1, node 2, node 3, node 4, node 5, node 6 and node 8.

To obtain an updated score at node 8, the system determines a vector representation at node 8, which is a numerical representation of the lattice portion 904 traversed up to node 8. The vector representation at node 8 is conditioned on the vector representation at node 6. Accordingly, the vector representation at node 8 is based on the vector representation determined at node 6. Because node 8 is a final node, the vector representation at node 8 is a potential vector representation of the entire lattice or at least is a vector representation of the third path and the fourth path. Similarly, the vector representation at node 7 is a potential vector representation of the entire lattice or at least is a vector representation of the first path and the second path. The combined RNN vector representations of node 7 and node 8 thus may represent the entire lattice portion 904.

To determine the vector representation of the entire lattice including the two additional paths, the system may implement a combination function or make a selection based on the updated scores. For example, the system may select the vector representation at node 7, node 8, or a combination of node 7 and node 8 for the vector representation of the entire lattice. An example of a combination function for combining the vector representation at node 7 and at node 8 is a pooling function illustrated in equation 7. In this case, a final state $h(S_n)$ is represents the encoding of the entire lattice of paths that lead to node 7 and node 8. More information (e.g., weights, scores, etc.) may be included in the encoding of the lattice by choosing a weighted pooling function, for example.

$$h(S_n) = f_{pool}(\vec{S}_s \in \text{final\_states}) \quad\quad 7$$

where $f_{pool}$ is a pooling function defined by the RNN; and
$h(S_n)$ is the final state vector representation calculated by the RNN The final states of the vector representation $h(S_n)$ determined by the RNN is the encoding of the entire lattice $h(L)$ that includes arcs, scores or weights, nodes, etc., into a single vector representation.

Although the description is directed to ASR processing and ASR correction, the aspects of the present disclosure are also applicable to other implementations that involve a lattice or direct acyclic graph. For example, the above described implementation may be applied to intent confirmation and machine translation for translating an ASR output into another language. An intent classifier may receive a lattice that represents query. The intent classifier parses the query to determine an intent or intents for identified domains, where the intent corresponds to the action to be performed that is responsive to the query. The intent classifier may be trained to process encodings of the lattice portion. For example, the intent classifier may receive the encoding of the lattice portion and classifies the encoding into a preset number of intent. Thus, as can be appreciated, the above techniques may apply not only for ASR correction, but for vector encoding and results confirmation for any operations involving lattices or acyclic graphs.

Figure 10:
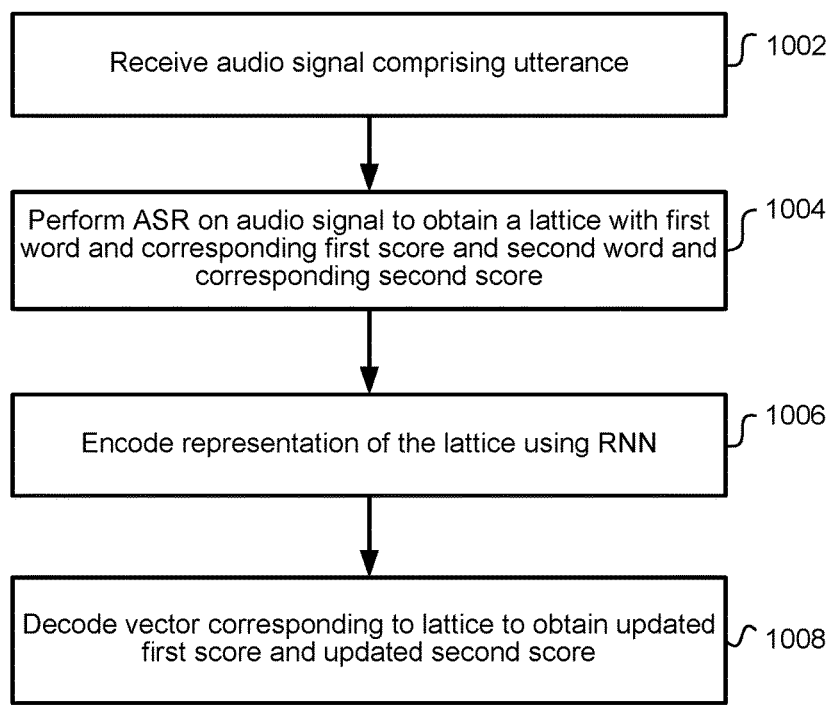
FIG. 10 is a flow chart illustrating performing speech recognition with recurrent neural networks according to embodiments of the present disclosure.

FIG. 10 is a flow chart illustrating performing speech recognition with recurrent neural networks according to embodiments of the present disclosure. As illustrated, the system may receive an audio signal comprising an utterance, as shown in block 1002. The system may perform speech recognition on the audio signal using an acoustic model and a language model to obtain a lattice of speech recognition results, as shown in block 1004. The lattice may include a first path and a second path. The first path includes a first arc originating at a first node and terminating at a second node. The first arc is associated with a first score and a first word. The second path includes a second arc originating at a third node and terminating at the second node. The second arc is associated with a second score and a second word. The lattice may be represented in a variety of forms, including a table or matrix as discussed above in reference to Table 1. The system may then encode the lattice to obtain an encoded vector representing the lattice, as shown in block 1006.

The encoded vector may be determined using a recurrent neural network (RNN) at the second node that is shared between the first path and the second path. For improved ASR results, the RNN is trained using lattice data. The encoded vector for the lattice may be based on a combination of a first encoded vector corresponding to the first node and a second encoded vector corresponding to the second node.

Figure 11:
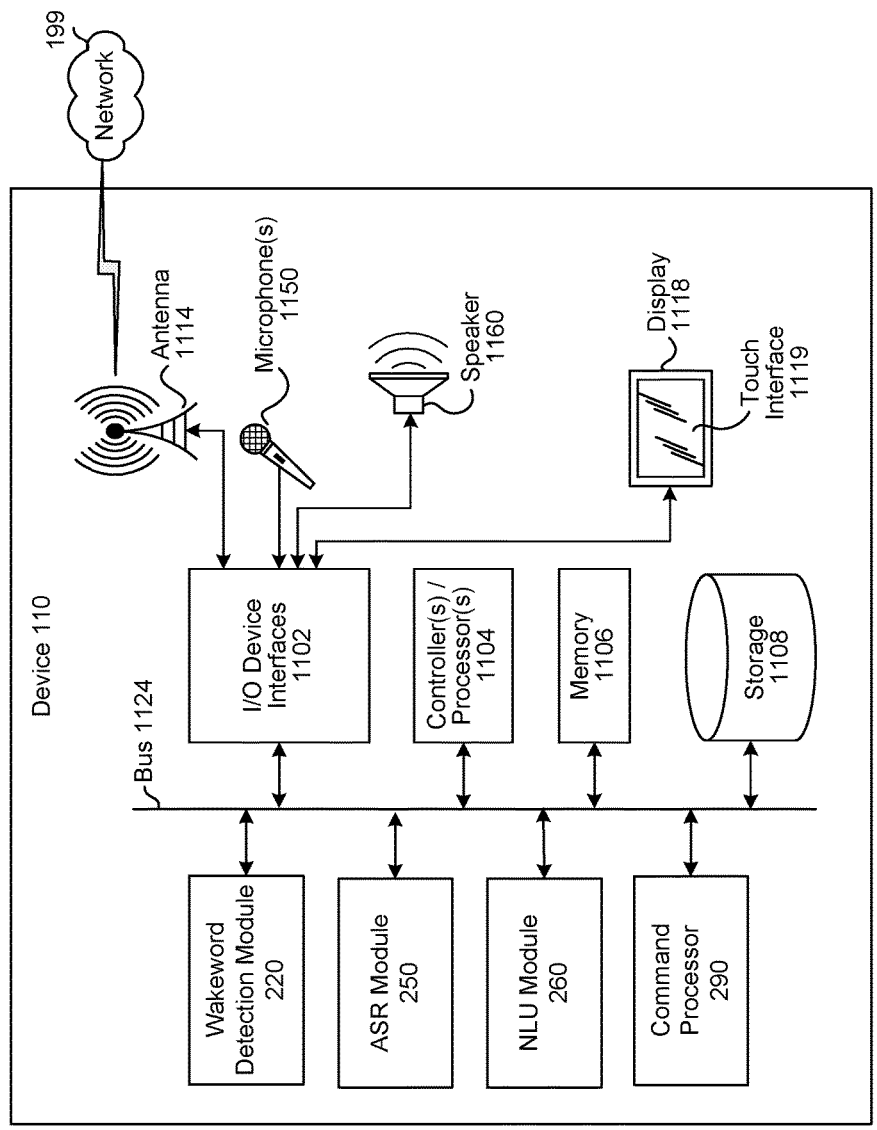
FIG. 11 is a block diagram conceptually illustrating example components of a device according to embodiments of the present disclosure.
Figure 12:
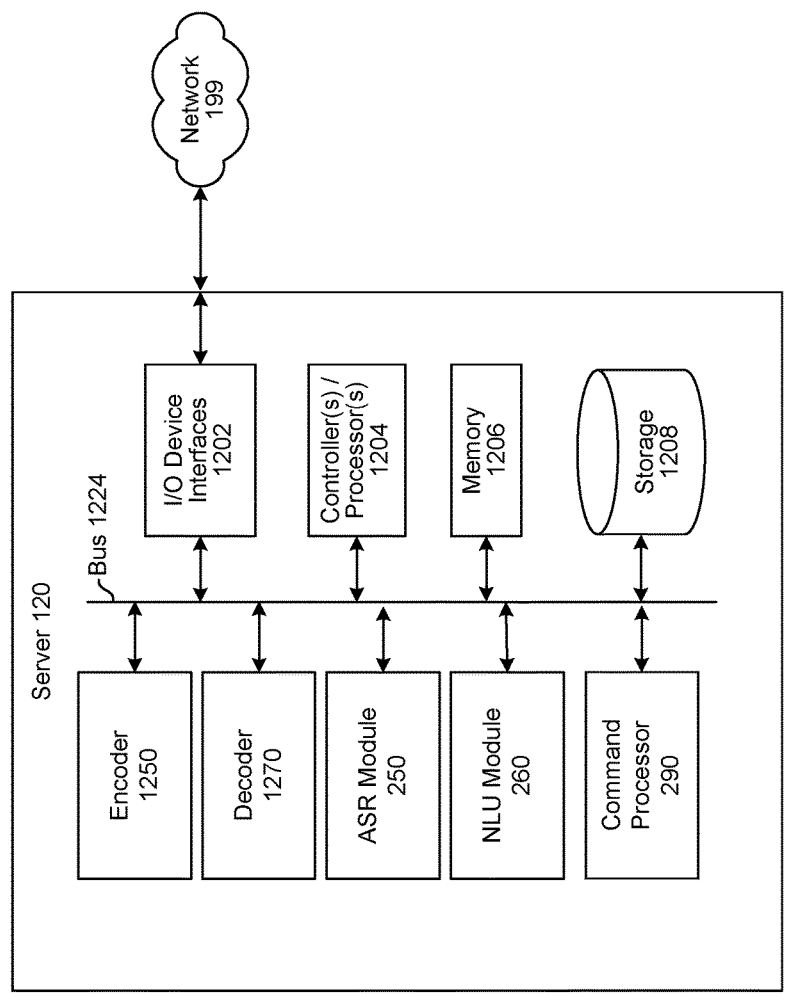
FIG. 12 is a block diagram conceptually illustrating example components of a server according to embodiments of the present disclosure.

The system may then decode the encoded vector of the lattice using techniques described above. The system may then determine a new updated lattice, and in doing so may updates the first score and the second score, as shown in block 1008. Thus a decoder of the system decodes the resulting numerical representation of a lattice into a rescored lattice FIG. 11 is a block diagram conceptually illustrating a local device 110 that may be used with the described system. FIG. 12 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces, as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to the device 110 of FIG. 11, the device 110 may include a display 1118, which may comprise a touch interface 1119. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1102 that connect to a variety of components such as an audio output component such as a speaker 1160, a wired headset or a wireless headset (not illustrated) or other component capable of outputting audio. The device 110 may also include an audio capture component. The audio capture component may be, for example, a microphone 1150 or array of microphones, a wired headset or a wireless headset (not illustrated), etc. The microphone 1150 may be configured to capture audio. If an array of microphones is included, approximate distance to a sound's point of origin may be performed acoustic localization based on time and amplitude differences between sounds captured by different microphones of the array. The device 110 (using microphone 1150, wakeword detection module 220, ASR module 250, etc.) may be configured to determine audio data corresponding to detected audio data. The device 110 (using input/output device interfaces 1102, antenna 1114, etc.) may also be configured to transmit the audio data to server 120 for further processing or to process the data using internal components such as a wakeword detection module 220.

For example, via the antenna(s), the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge exchange and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1108 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1108 and compare the captured audio to the stored models and audio sequences using audio comparison, pattern recognition, keyword spotting, audio signature, and/or other audio processing techniques.

The server may also include an encoder 1250 for encoding a lattice into a matrix or vector form and a decoder 1270 for decoding a vector/matrix form representation of a lattice into a rescored lattice. As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 11 and 12, are exemplary, and may be located a stand-alone device or may be included, in whole or in part, as a component of a larger device or system.

Figure 13:
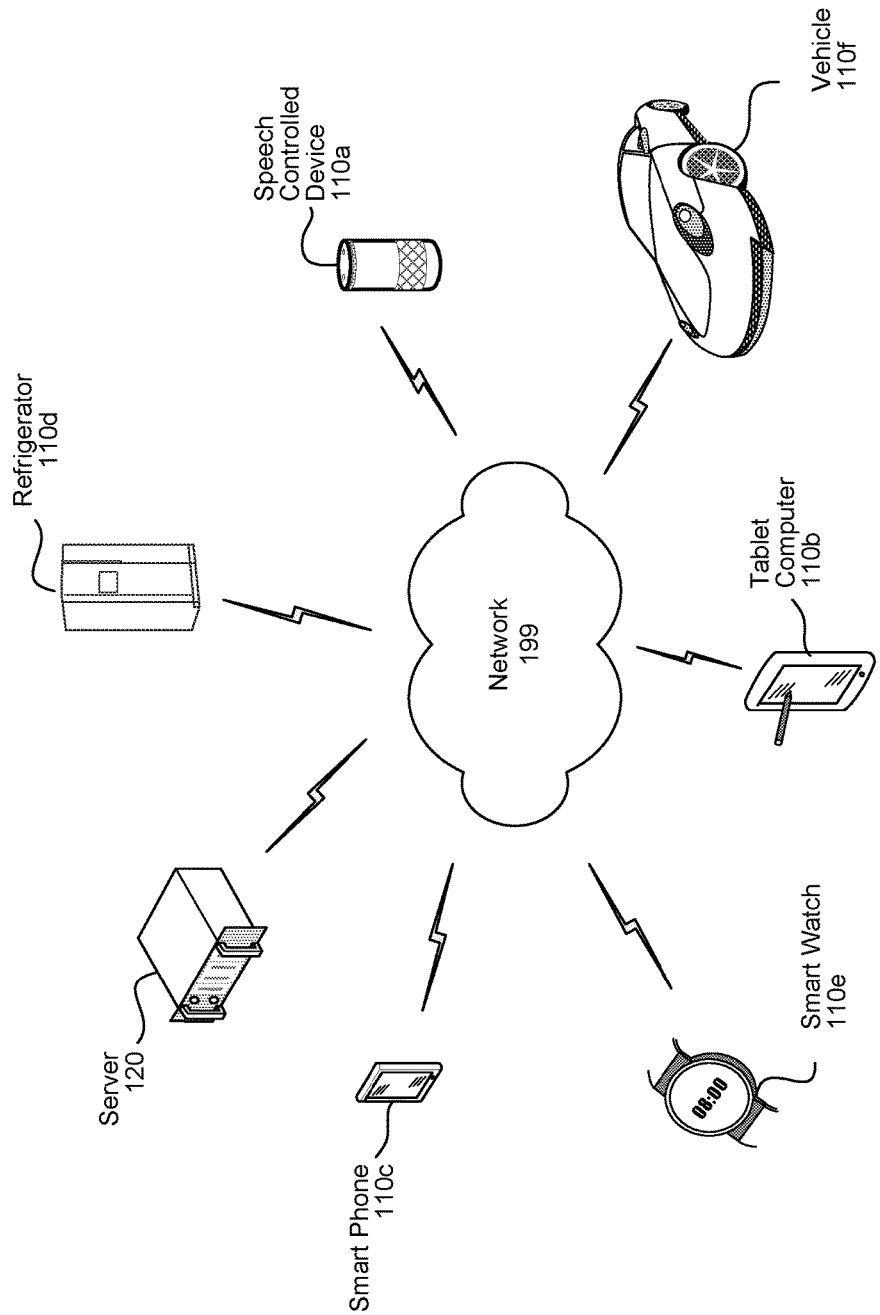
FIG. 13 illustrates an example of a computer network for use with the system.

As illustrated in FIG. 13 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1150 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for updating speech recognition results using a recurrent neural network, the method comprising:
   receiving audio data corresponding to an utterance;
   performing automatic speech recognition (ASR) processing on the audio data to obtain a first ASR lattice portion;
   determining a representation of the first ASR lattice portion, wherein the representation of the first ASR lattice portion comprises at least:
   a representation of a first path comprising:
      a first indication that a first node is connected to a second node along a first arc, the first indication associated with a first score and a first word, and
      a second indication that the second node is connected to a third node along a second arc, the second indication associated with a second score and a second word; and
   a representation of a second path comprising:
      the first indication, and
      a third indication that the second node is connected to a fourth node along a third arc, the third indication associated with a third score and a third word;
   determining that the first path comprises a higher score than the second path;
   processing the representation of the first ASR lattice portion using a recurrent neural network (RNN) encoder to obtain an encoded vector corresponding to the first ASR lattice portion;
   processing the encoded vector using an RNN decoder to obtain an updated ASR lattice portion, the processing the encoded vector comprising:
      processing, at a first time, the encoded vector using the RNN decoder to obtain the first word and a corresponding updated first score,
      processing, at a second time after the first time, the encoded vector and the first word using the RNN decoder to obtain the second word and a corresponding updated second score,
      processing, at a third time after the second time, the encoded vector and the second word using the RNN decoder to obtain the third word and a corresponding updated third score, and
      processing, at a fourth time after the third time, the encoded vector and the third word using the RNN decoder to obtain a fourth word and a corresponding fourth score;
   determining a highest scoring path using the updated first score, updated second score and updated third score; and
   determining at least one ASR hypothesis based at least in part on a score associated with the highest scoring path.

2. The computer-implemented method of claim 1, wherein obtaining the updated ASR lattice portion comprises processing the encoded vector using the RNN decoder to obtain a representation of the updated ASR lattice portion comprising:
   a representation of an updated first path comprising:
      a fourth indication that the first node is connected to the second node along the first arc, the fourth indication associated with the updated first score and the first word, and
      a fifth indication that the second node is connected to the third node along the second arc, the fifth indication associated with the updated second score and the second word;
   a representation of an updated second path comprising:
      the fourth indication, and
      a fifth indication that the second node is connected to a fourth node along the third arc, the fifth indication associated with the updated third score and the third word; and
   a representation of a third new path comprising:
      the fourth indication, and
      a sixth indication that the second node is connected to a fifth node along a fourth arc, the sixth indication associated with the fourth score and the fourth word.

3. The computer-implemented method of claim 2, wherein
  determining the highest scoring path comprises:
    combining the updated first score and the first score to obtain a shared first score for the first arc;
    combining the updated second score and the second score to obtain a shared second score for the second arc;
    combining the updated third score and the third score to obtain a shared third score for the third arc; and
    determining the highest scoring path using the shared first score, shared second score, shared third score and fourth score.

4. The computer-implemented method of claim 3, further comprising:
  assigning a first weight to the first ASR lattice portion;
  assigning a second weight to the updated ASR lattice portion, and
  wherein combining the updated first score and the first score comprises:
    multiplying the first score by the first weight to obtain a first adjusted score,
    multiplying the updated first score by the second weight to obtain a second adjusted score,
    adding the first adjusted score to the second adjusted score to obtain a sum, and
    dividing the sum by two to obtain the shared first score.

5. A computer-implemented method comprising:
  receiving first audio data corresponding to a first utterance;
  processing the first audio data to determine a first matrix representing a first automatic speech recognition (ASR) lattice;
  processing the first matrix using a recurrent neural network (RNN) encoder to obtain a first encoded vector corresponding to the first ASR lattice;
  processing the first encoded vector using an RNN decoder to obtain a second matrix representing an updated ASR lattice;
  determining a highest scoring path associated with the updated ASR lattice, wherein the highest scoring path associated with the updated ASR lattice is different from a highest scoring path associated with the first ASR lattice; and
  determining at least one ASR hypothesis based at least in part on a score associated with the highest scoring path associated with the updated ASR lattice.

6. The computer-implemented method of claim 5, wherein:
  the first matrix comprises:
    a first representation of a first path of the first ASR lattice, the first representation comprising:
      first data indicating that a first node is connected to a second node, the first data being associated with a first score and first associated data, and
    a second representation of a second path of the first ASR lattice, the second representation comprising:
      second data indicating that the first node is connected to a third node, the second data being associated with a second score and second associated data; and
  the second matrix comprises:
    a third representation of an updated first path of the updated ASR lattice comprising:
      third data indicating that the first node is connected to the second node, the third data being associated with an updated first score and the first associated data; and
    a fourth representation of an updated second path of the updated ASR lattice comprising:
      fourth data indicating that the first node is connected to the third node, the fourth data being associated with an updated second score and the second associated data.

7. The computer-implemented method of claim 6, wherein processing the first encoded vector using the RNN decoder comprises:
  processing, at a first time, the first encoded vector using the RNN decoder to obtain the first associated data and the updated first score; and
  processing, at a second time after the first time, the first encoded vector and the first associated data using the RNN decoder to obtain the second associated data and the updated second score.

8. The computer-implemented method of claim 7, wherein processing the first encoded vector using the RNN decoder further comprises:
  processing, at a third time, the first encoded vector and the second associated data using the RNN decoder to obtain third associated data and a third score,
  wherein the second matrix further comprises fifth data indicating that the first node is connected to a fourth node, the fifth data being associated with the third associated data and the third score.

9. The computer-implemented method of claim 8, further comprising:
  determining the updated first score is below a score threshold; and
  determining a second updated ASR lattice wherein the second updated ASR lattice excludes the updated first path.

10. The computer-implemented method of claim 6, wherein
  determining the highest scoring path associated with the updated ASR lattice comprises:
    combining the updated first score and the first score to obtain a new first score corresponding to the first path;
    adding the second updated score and the second score to obtain a new second score corresponding to the second path; and
    determining the highest scoring path associated with the updated ASR lattice using the new first score and new second score.

11. The computer-implemented method of claim 6, further comprising performing automatic speech recognition to determine the first ASR lattice, and wherein the first associated data comprises a first word and the second associated data comprises a second word.

12. The computer-implemented method of claim 5, further comprising:
  assigning a first weight to the first ASR lattice;
  assigning a second weight to the updated ASR lattice;
  multiplying scores from the first ASR lattice by the first weight to obtain first weighted scores; and
  multiplying scores from the updated ASR lattice by the second weight to obtain second weighted scores,
  wherein determining the highest scoring path associated with the updated ASR lattice comprises using the first weighted scores and the second weighted scores.

13. A computing device comprising:
at least one processor; and
a memory device including instructions operable to be executed by the at least one processor to configure the device to:
receive first audio data corresponding to a first utterance;
process the first audio data to determine a first matrix representing a first automatic speech recognition (ASR) lattice;
process the first matrix using a recurrent neural network (RNN) encoder to obtain a first encoded vector corresponding to the first ASR lattice;
process the first encoded vector using an RNN decoder to obtain a second matrix representing an updated ASR lattice;
determine a highest scoring path associated with the updated ASR lattice, wherein the highest scoring path associated with the updated ASR lattice is different from a highest scoring path associated with the first ASR lattice; and
determine at least one ASR hypothesis based at least in part on a score associated with the highest scoring path associated with the updated ASR lattice.

14. The computing device of claim 13, wherein:
the first matrix comprises:
a first representation of a first path of the first ASR lattice, the first representation comprising:
first data indicating that a first node is connected to a second node, the first data being associated with a first score and first associated data, and
a second representation of a second path of the first ASR lattice, the second representation comprising:
second data indicating that the first node is connected to a third node, the second data being associated with a second score and second associated data; and
the second matrix comprises:
a third representation of an updated first path of the updated ASR lattice comprising:
third data indicating that the first node is connected to the second node, the third data being associated with an updated first score and the first associated data; and
a fourth representation of an updated second path of the updated ASR lattice comprising:
fourth data indicating that the first node is connected to the third node, the fourth data being associated with an updated second score and the second associated data.

15. The computing device of claim 14, wherein the memory device includes additional instructions operable to be executed by the at least one processor to further configure the computing device to process the first encoded vector using the RNN decoder at least by:
processing, at a first time, the first encoded vector using the RNN decoder to obtain the first associated data and the updated first score; and
processing, at a second time after the first time, the first encoded vector and the first associated data using the RNN decoder to obtain the second associated data and the updated second score.

16. The computing device of claim 15, wherein the memory device includes additional instructions operable to be executed by the at least one processor to further configure the computing device to process the first encoded vector using the RNN decoder at least by:
processing, at a third time, the first encoded vector and the second associated data using the RNN decoder to obtain third associated data and a third score,
wherein the second matrix further comprises fifth data indicating that the first node is connected to a fourth node, the fifth data being associated with the third associated data and the third score.

17. The computing device of claim 16, wherein the memory device includes additional instructions operable to be executed by the at least one processor to further configure the computing device to:
determine the updated first score is below a score threshold; and
determine a second updated ASR lattice wherein the second updated ASR lattice excludes the updated first path.

18. The computing device of claim 14, wherein the memory device includes additional instructions operable to be executed by the at least one processor to further configure the computing device to determine the highest scoring path associated with the updated ASR lattice at least by:
combining the updated first score and the first score to obtain a new first score corresponding to the first path;
adding the second updated score and the second score to obtain a new second score corresponding to the second path; and
determining the highest scoring path associated with the updated ASR lattice using the new first score and new second score.

19. The computing device of claim 14, wherein the memory device includes additional instructions operable to be executed by the at least one processor to further configure the computing device to perform automatic speech recognition to determine the first ASR lattice, and wherein the first associated data comprises a first word and the second associated data comprises a second word.

20. The computing device of claim 13, wherein the memory device includes additional instructions operable to be executed by the at least one processor to further configure the computing device to:
assign a first weight to the first ASR lattice;
assign a second weight to the updated ASR lattice;
multiply scores from the first ASR lattice by the first weight to obtain first weighted scores; and
multiply scores from the updated ASR lattice by the second weight to obtain second weighted scores,
wherein determining the highest scoring path associated with the updated ASR lattice comprises using the first weighted scores and the second weighted scores.

* * * * *